Dec. 22, 1953　　　　　F. CAIOLA　　　　2,663,437
GARAGE, AIR RAID SHELTER OR THE LIKE
Filed June 29, 1951　　　　　　　　　　6 Sheets-Sheet 1

INVENTOR.
Fred Caiola
BY
Williams, Rich & Morse
Attorneys

Dec. 22, 1953   F. CAIOLA   2,663,437
GARAGE, AIR RAID SHELTER OR THE LIKE
Filed June 29, 1951   6 Sheets-Sheet 2

INVENTOR.
Fred Caiola
BY
Attorneys

Dec. 22, 1953  F. CAIOLA  2,663,437
GARAGE, AIR RAID SHELTER OR THE LIKE
Filed June 29, 1951  6 Sheets-Sheet 3

INVENTOR.
Fred Caiola
BY
Williams, Rich & Morse
Attorneys

Dec. 22, 1953 F. CAIOLA 2,663,437
GARAGE, AIR RAID SHELTER OR THE LIKE
Filed June 29, 1951 6 Sheets-Sheet 4
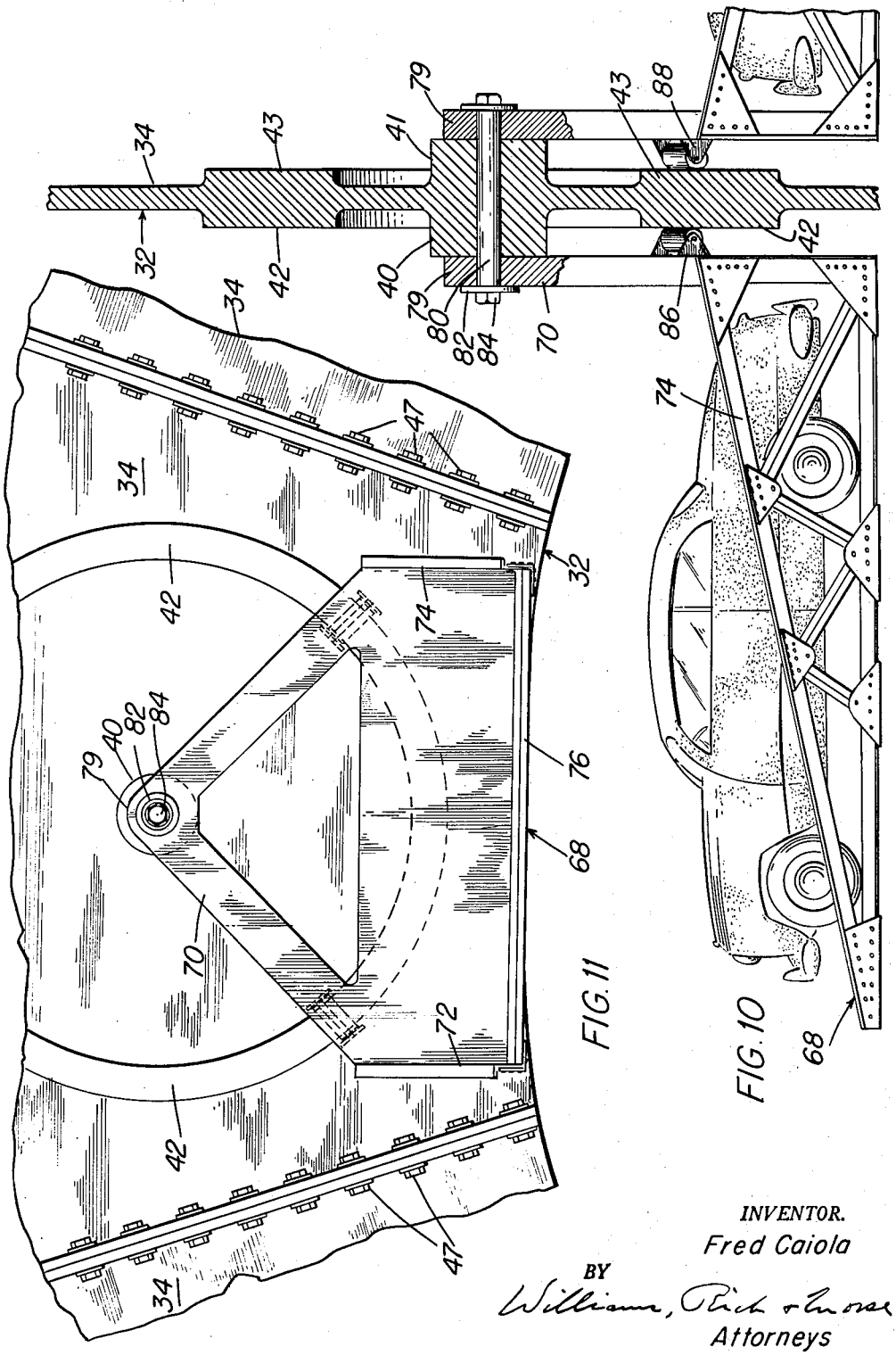
INVENTOR.
Fred Caiola
BY
Williams, Rich & Morse
Attorneys Dec. 22, 1953          F. CAIOLA          2,663,437
GARAGE, AIR RAID SHELTER OR THE LIKE
Filed June 29, 1951          6 Sheets-Sheet 5
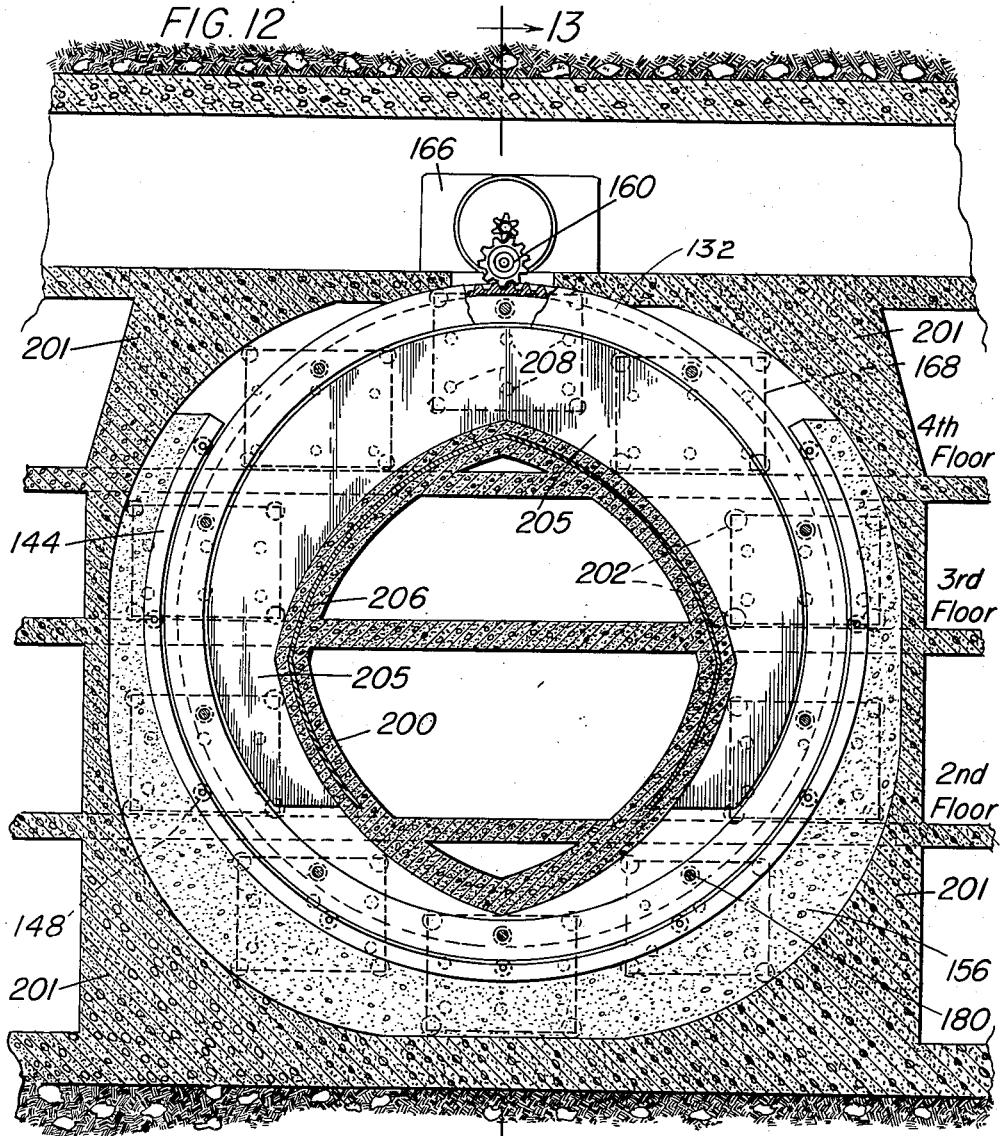
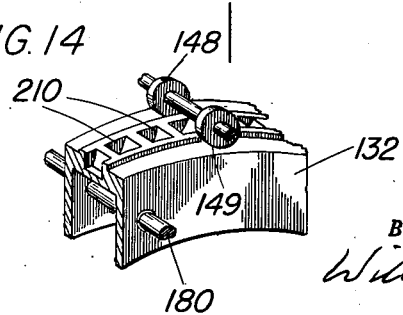
INVENTOR.
Fred Caiola
BY
Attorneys Dec. 22, 1953     F. CAIOLA     2,663,437
GARAGE, AIR RAID SHELTER OR THE LIKE
Filed June 29, 1951     6 Sheets-Sheet 6

INVENTOR.
Fred Caiola
BY
Attorneys

Patented Dec. 22, 1953

2,663,437

UNITED STATES PATENT OFFICE 2,663,437

GARAGE, AIR-RAID SHELTER, OR THE LIKE

Fred Caiola, Bronx, N. Y.

Application June 29, 1951, Serial No. 234,173

6 Claims. (Cl. 214—16.1)

This invention relates to an air raid shelter, garage or the like which is preferably, but not necessarily, located below ground level.

The general object of the invention is to provide for the housing of people during an air raid and to provide a garage for the storage of motor vehicles having general utility during peacetime. The invention resides in the elevating means by which motor vehicles and groups of people may be carried from one floor to another of the garage or shelter at a rapid rate. To this end, the invention is characterized by the construction and arrangement of parts hereinafter described with reference to the drawings in which, Fig. 1 is a sectional plan view of the structure at the top floor showing the entrance and exit ramps;

Fig. 10 is a side elevation of a load-carrying platform and the means by which it is pivotally suspended from the rotatable ring;

Fig. 11 is an elevation looking at the right side of Fig. 10;

Fig. 12 is a sectional elevation of a modified form of structure and elevating mechanism, taken on the line 12—12 of Fig. 13;

Fig. 14 is a detailed sectional perspective of the rotatable ring of Figs. 12 and 13 showing its roller support.

Figure 2:
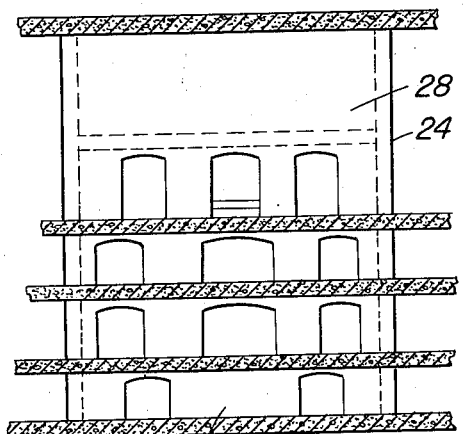
Fig. 2 is a sectional elevation of the structure on the plane 2—2 of Fig. 1.
Figure 3:
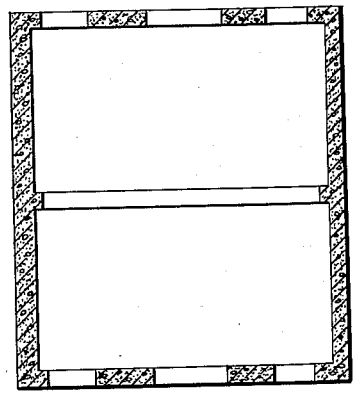
Fig. 3 is a sectional plan view of the third floor of the structure.
Figure 1:
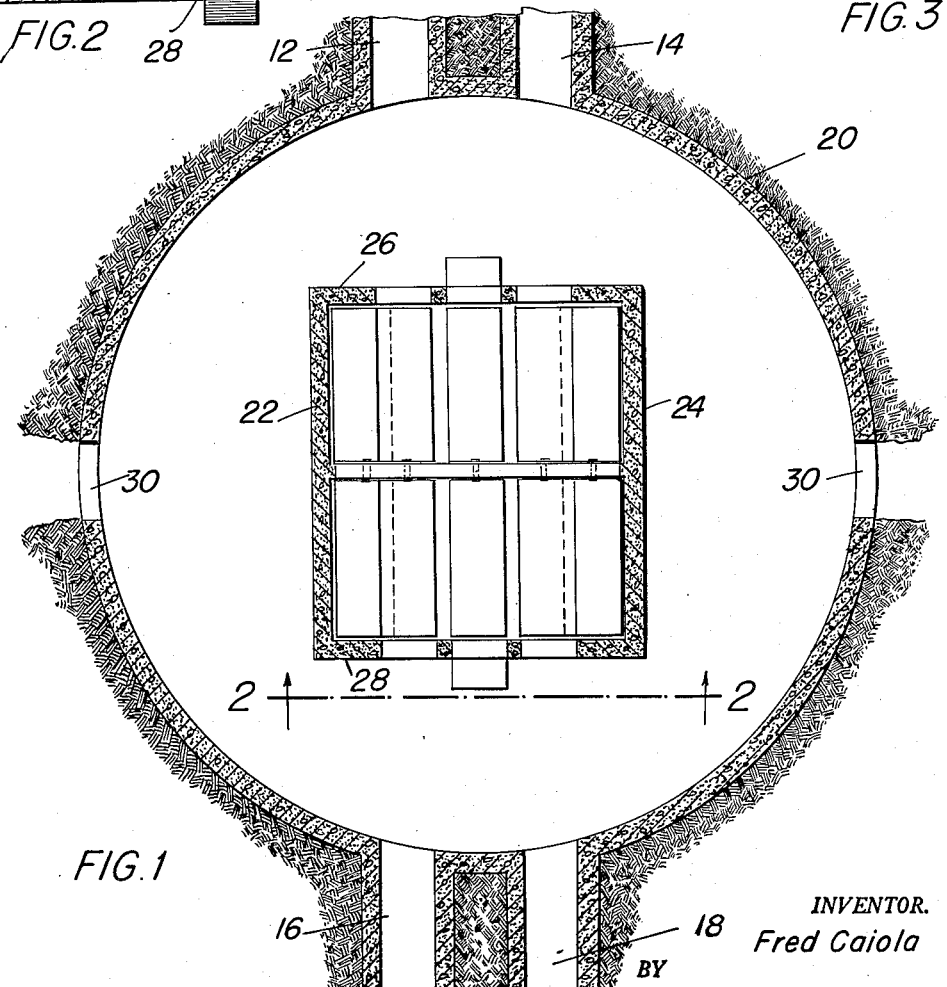

Referring to the drawings, the invention there illustrated is embodied in a structure which is preferably made of reinforced concrete and located below ground level. As illustrated, this structure has four floors (but it will be understood that the invention may be embodied in a structure having more or less floors) capable of accommodating vehicles and people. As illustrated in Fig. 1, entrance to and exit from the structure is by way of bulkheaded ramps 12, 14, 16 and 18 which lead from ground level to the top (4th) floor of the structure. As illustrated, the structure has a cylindrical vertical outer wall 20, but this may be of any other configuration. Arranged in the center of the space enclosed by the wall 20, is a well formed by a structure which is rectangular in horizontal cross-section and has side walls 22 and 24, and end walls 26 and 28 provided with doorways as shown in Figs. 1 to 3. This rectangular well houses the elevating device about to be described. The spaces on the various floors enclosed by the outer wall 20 may be treated as areas through which vehicles and people may pass to and from the elevating mechanism, and to and from auxiliary rooms (not shown) communicating with those areas through passageways 30.

Figure 4:
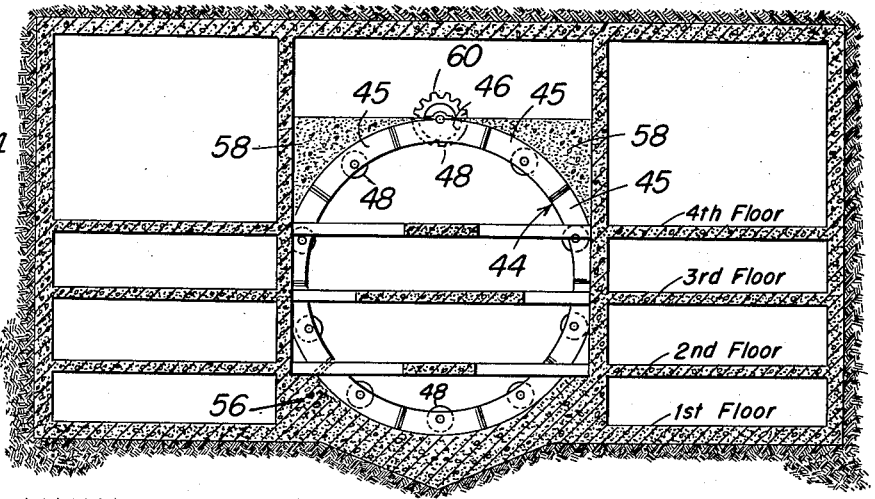
Fig. 4 is a sectional elevation of the structure.
Figure 5:
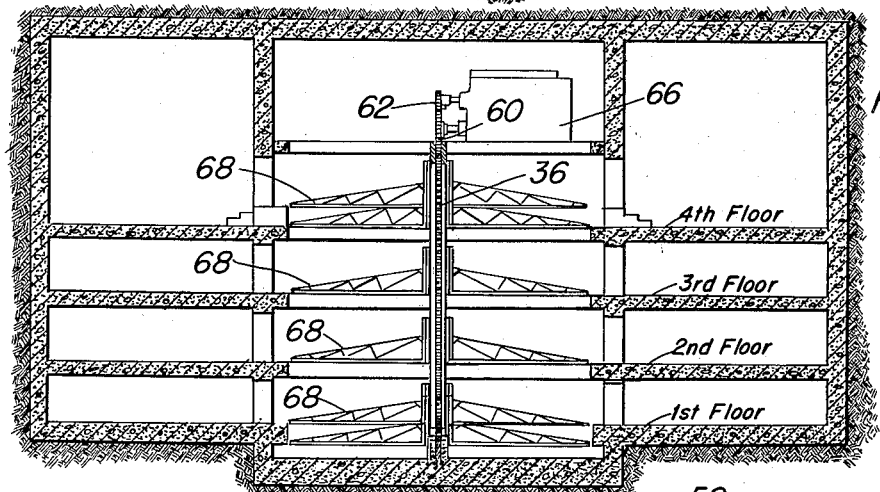
Fig. 5 is a sectional elevation of the structure taken at a right angle to the section of Fig. 4 and showing the elevating mechanism which is omitted from Figs. 1 to 4.
Figure 8:
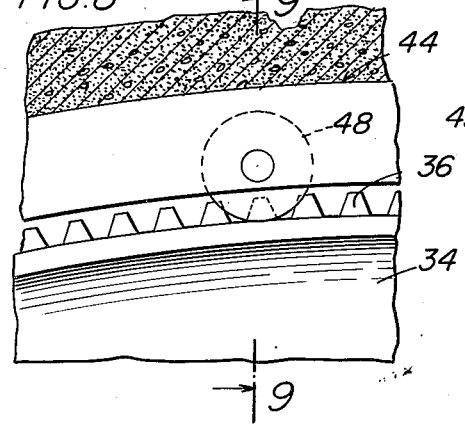
Fig. 8 is a fragmentary elevation showing how the rotatable ring is supported by the stationary ring.
Figure 9:
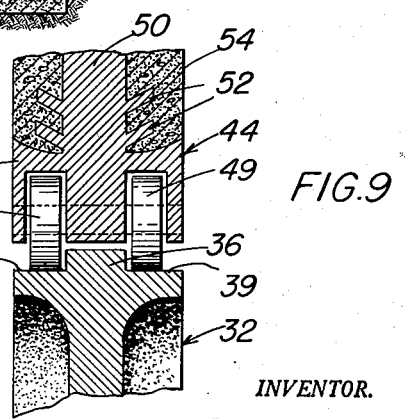
Fig. 9 is a fragmentary sectional view on the line 9—9 of Fig. 8.
Figure 6:
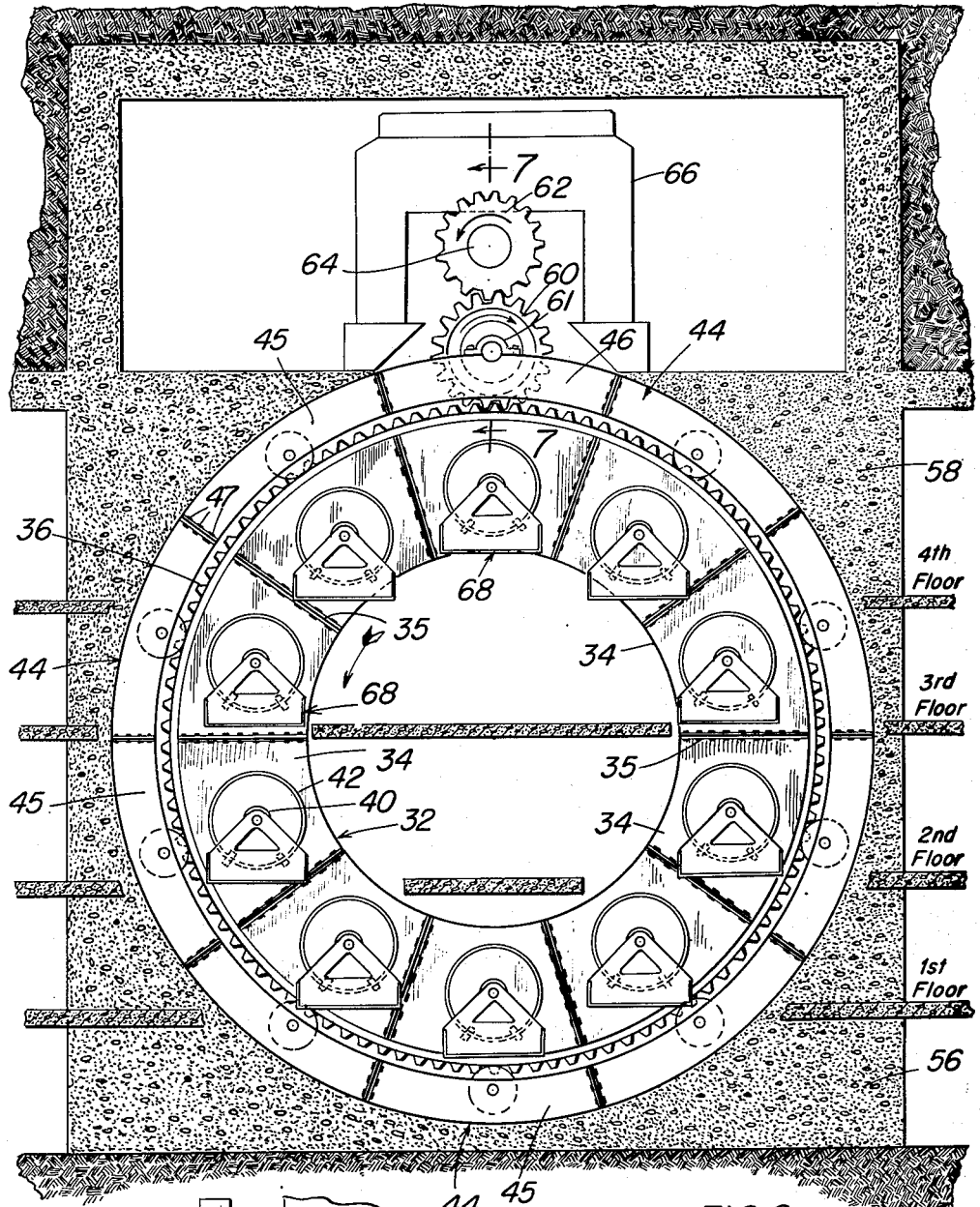
Fig. 6 is a sectional elevation of the structure showing the elevating mechanism.
Figure 7:
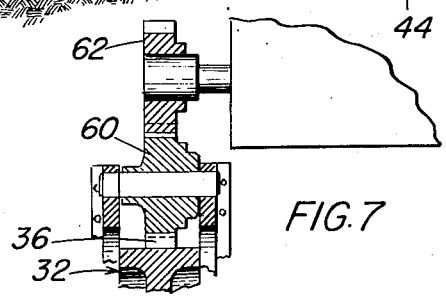
Fig. 7 is a fragmentary sectional elevation on the line 7—7 of Fig. 6.

The elevating mechanism, by which vehicles and people may be transported from one floor to any other floor, will now be described. As best shown in Fig. 6, the elevating mechanism includes a rotatable ring 32 composed of segmental plates 34 having at their edges flanges which are bolted together as indicated at 35. The ring 32 is provided on its outer circumference with gear teeth 36 and bearing surfaces 38 and 39, as best shown in Figs. 8 and 9. The plates 34 are also provided on both sides with projecting bosses 40 and 41 and with bearing surfaces 42 and 43, which serve purposes hereinafter described. The ring 32 thus formed is located in a vertical plane within a fixed ring 44 surrounding and spaced slightly from the rotatable ring 32. This fixed ring 44 is made of segmental portions 45 which are alike, and a pair of top segmental portions 46 between which a driving gear is located as hereinafter described. These segmental portions 45 are secured to one another and to the segmental portions 46 by bolts 47 which pass through flanges provided in the segmental portions as shown in Fig. 6. As shown in Figs. 4, 6, 8 and 9, the segmental portions 45 of the fixed ring 44 rotatably support rollers 48 and 49 which cooperate with the bearing surfaces 38 and 39 on the circumference of the rotatable ring 32, thereby rotatably supporting the rotatable ring 32 within the fixed ring 44. As best shown in Fig. 9, the segmental portions 45 of the fixed ring 44 are provided with outwardly extending portions 50 from which extend fins 52, and these portions of the fixed ring 44 are embedded in cast concrete 54 integral with the well structure. Thus the bottom half of the fixed ring 44 is supported on a concrete wall 56, and the upper portion of the fixed ring 44 is supported by a concrete wall 58, as shown in Figs. 4 and 6. Located between the segmental portions 46 of the fixed ring 44 and cooperating with the gear teeth 36 on the circumference of the rotatable ring 32, is a gear 60 which is supported in suitable bearings 61 on the tops of the segmental portions 46. Meshing with the gear 60 is a gear 62 fixed to a shaft 64 of a suitable prime mover such as a diesel engine or electric motor 66 having suitable speed reducing means. Thus the rotatable ring 32 may be rotated intermittently for the purposes hereinafter described.

Figs. 6, 10 and 11 show how the load-carrying platforms or cars 68, arranged in pairs with the platforms in each pair extending laterally from said rotatable ring 32 on opposite sides thereof, are pivotally suspended from said rotatable ring. These platforms 68 each comprise a yoke portion 70 to which are secured side portions 72 and 74, and a floor portion 76 which is attached to the side portions 72 and 74 and to the yoke portion 70. Each yoke portion 70 is provided at its top with a bearing portion 79 which cooperates with a shaft 80 passing through and secured within the bosses 40 and 41 extending from the opposite sides of each of segmental plates 34 forming the rotatable ring 32. Each bearing portion 79 is retained on the shaft 80 by a disc 82 through which a screw 84 passes and is seated in a threaded hole in the end of the shaft 80. Supported in bearings secured to the back of each yoke portion 70, are rollers 86 and 88 (best shown in Fig. 10) which cooperate with the bearing surfaces 42 and 43 on the segmental portion 34. Thus the load-carrying platforms 68 are pivotally supported from the shafts 80 projecting from the rotatable ring 32, with the result that the floors 76 of the platforms are at all times horizontal during the rotation of the ring 32.

In the embodiments of the invention illustrated in the drawings, there are twenty load carrying platforms, 10 on each side of the supporting ring, and four floors to and from which vehicles and people may be carried by the elevating mechanism. When the elevating mechanism is at rest in the position shown in Fig. 6, six carrying platforms are adjacent each of the top and bottom (1st and 4th) floors, and four carrying platforms are in alignment with each of the 2nd and 3rd floors, thereby permitting loading and unloading of those platforms. Therefore, rapid transportation of vehicles and people from the fourth floor to the third, second and first floors, and between all of the floors, is facilitated, as the elevating mechanism is intermittently actuated.

For example, assuming that the garage or air-raid shelter is empty and it is desired to fill it with persons, vehicles or materials as rapidly as possible: The upper three pairs of carrying platforms (that is, six platforms) would be loaded simultaneously from the top (4th) floor; and then the rotatable ring 32 would be rotated three-tenths of a revolution, thereby moving those six loaded platforms into alignment respectively with the 3rd, 2nd and 1st floors, and bringing six more platforms into the position in which they may be loaded from the top (4th) floor. While the six platforms in alignment with the 3rd, 2nd and 1st floors are being unloaded, the six platforms adjacent the 4th floor may be loaded. Then the rotatable ring 32 may be again rotated three-tenths of a revolution, and the unloading and loading operations just mentioned may be repeated. Thus a minimum of twelve platforms may be in use simultaneously, six of them being engaged in receiving and six of them being engaged in delivering their loads. Obviously, the result is that the garage or air-raid shelter is capable of being filled with persons, materials and vehicles at a very rapid rate. Of course it may be emptied with equal rapidity.

The modified structure and elevating mechanism shown in Figs. 12, 13 and 14 will now be described. The principal difference in this embodiment of the invention over that described above is the supporting structure for the cars or platforms. To indicate general correspondence of parts, numbers higher by 100 than equivalent parts in the structure previously described will be used so that they need not be described in detail.

Figure 13:
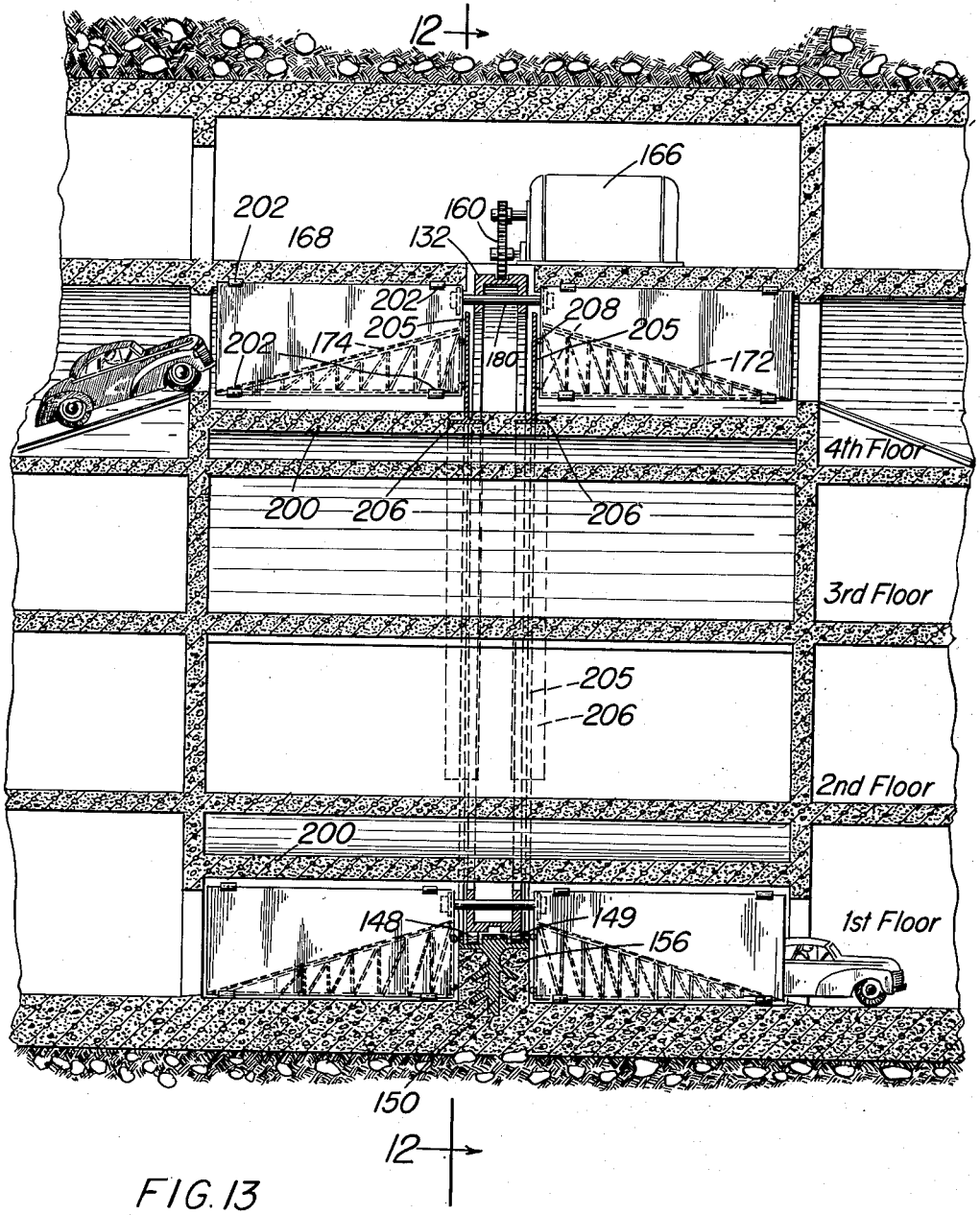
Fig. 13 is a sectional elevation, taken on the line 13—13 of Fig. 12.

Referring to Fig. 13, the platforms 168 are enclosed on all four sides so that they are in the shape of open-end rectangular boxes having suitable internal supporting side structures 172 and 174. These cars are suspended from shafts 180 carried in a rotating ring 132 of U-shaped cross-section. This ring is supported by pairs of rollers 148 and 149 carried at intervals in a fixed ring 144. Both the rotatable and the fixed rings 132 and 144 may be made in sections for assembly in the monolithic concrete structure. The fixed ring is secured in the concrete by means of suitable anchors 150.

One characteristic feature of this embodiment is that the cars 168 travel between and are supported by continuous walls defining an annular space, the shape of the space enclosed by these walls corresponding to the path followed by the cars as the ring rotates. This is best seen in Fig. 12 where the inner wall is shown at 200 and the outer wall at 201. Tracing the movement of one of the cars (the positions of which are shown in dotted lines in this figure) from the top of this annular tunnel-like structure in a clockwise direction, it will be seen that as the car begins to descend, its lower inside corner comes in contact with the inner wall 200 on which it rests for about a quarter revolution. At the same time the upper outside corner is in contact with the outer wall 201. As the car moves from the 3 o'clock to the 6 o'clock position its upper inside corner contacts the inside wall and its lower outside corner contacts the outside wall. Suitable rolling contact is made by providing the cars with rollers 202 on all four edges as shown in Fig. 13. The rollers may be spring-mounted to compensate for any irregularities in the supporting surfaces and they serve effectively to steady and in part to support the cars during their travel.

Instead of the bearing rings 42 and rollers 86 of the previously described structure in which each car had its own bearing ring, the present embodiment provides stationary supporting structures on the surfaces of which the suspension ends of the cars roll. The first of these supporting surfaces is inside the rotating supporting ring and is engaged by the cars when they are in the upper part of the annular space and consists of a supporting plate 205, horseshoe-shaped in elevation, extending radially outwardly from and secured in the inner wall 200. This plate lies in a plane parallel to the plane of ring 132 and displaced outwardly therefrom a short distance, terminating at its lower ends just above the second floor. The supporting plate is made with a base flange 206 which is embedded in the concrete of the inner wall 200. There are two of these plates, one on either side of the ring 132. They may be made in sections and joined during construction.

Another pair of surfaces for the support of the inner ends of the cars outwardly of the rotating supporting ring is provided by the vertical faces of the concrete supporting wall 156 by which the inner ring 144 is carried. The faces of the wall 156, the upper ends of which terminate just above the fourth floor, are in the same plane as the outer faces of the two supporting plates 205.

The inner end of each car is provided with a plurality of suitable casters or rollers 208 adapted to roll in all directions to bear against the supports just described. As will be understood from Fig. 12, by the time the rollers on a car have moved off the lower ends of the plates 205 other rollers are resting on the surfaces of supporting wall 156.

The rotatable ring 132 is provided, as shown in Fig. 14, with recessed tracks which bear against the rollers 148 and 149 between which the ring is provided with gear tooth recesses 210 which are engaged by the teeth of driving gear 160 driven by the prime mover 166. It will of course be understood that as many driving motors or engines as may be necessary will be used to drive the rotatable ring and that they may be located at different points around its circumference.

It will of course be understood that the drawings are more or less diagrammatic and do not show all of the details that would be incorporated in an elevating mechanism of the kind which forms the subject of the present invention. For example, any even number of carrying platforms may be provided, depending upon the number of floors in the structure which are to be served by the elevating mechanism. Of course suitable guard rails and gates would be provided to insure the safety of vehicles and people using the structure and the elevating mechanism; and the operation of the elevating mechanism would be so controlled that it could not be actuated in a manner that would jeopardize the safety of vehicles and people. Such details can be readily provided; and, in the interest of simplicity, in describing the essential features of the invention such details have been omitted. It is also to be understood that the embodiments of the invention which have been illustrated and described may be modified in many respects without departing from the fundamental features thereof as set forth in the claims hereto appended.

What is claimed is:

1. In a garage, air-raid shelter or the like, a structure including a plurality of floors having openings therein, and an elevating mechanism comprising a ring rotatably supported in a vertical plane and extending through said floors, means for intermittently rotating said ring, load-carrying platforms arranged in pairs with the platforms in each pair extending laterally from said ring on opposite sides thereof, and means for pivotally suspending the platforms of each pair from said ring, whereby as said ring is intermittently rotated the pairs of platforms successively pass through the said openings in said floors and pairs of platforms are brought into alignment with the various floors.

2. In a garage, air-raid shelter or the like, a structure including a plurality of floors having openings therein, and an elevating mechanism comprising a ring located in a vertical plane and extending through said floors and provided on its outer circumference with bearing surfaces, rollers rotatably supported around said rings and cooperating with said bearing surfaces for rotatably supporting said ring, means for intermittently rotating said ring, load-carrying platforms arranged in pairs with the platforms in each pair extending laterally from said ring on opposite sides thereof, and means for pivotally suspending the platforms of each pair from said ring, whereby as said ring is intermittently rotated the pairs of platforms successively pass through the said openings in said floors and pairs of platforms are brought into alignment with the various floors.

3. In a garage, air-raid shelter or the like, a structure including a plurality of floors having openings therein, and an elevating mechanism comprising a ring located in a vertical plane and extending through said floors and provided on its outer circumference with gear teeth and bearing surfaces, rollers rotatably supported around said ring and cooperating with said bearing surfaces for rotatably supporting said ring, means cooperating with said gear teeth for intermittently rotating said ring, load-carrying platforms arranged in pairs with the platforms in each pair extending laterally from said ring on opposite sides thereof, and means for pivotally suspending the platforms of each pair from said ring, whereby as said ring is intermittently rotated the pairs of platforms successively pass through the said openings in said floors and pairs of platforms are brought into alignment with the various floors.

4. In a garage, air-raid shelter or the like, a structure including a plurality of floors having openings therein, and an elevating mechanism comprising a ring located in a vertical plane and extending through said floors and provided on its outer circumference with gear teeth and with bearing surfaces located on each side of said gear teeth, rollers rotatably supported around said ring and cooperating with said bearing surfaces for rotatably supporting said ring, means cooperating with said gear teeth for intermittently rotating said ring, load-carrying platforms arranged in pairs with the platforms in each pair extending laterally from said ring on opposite sides thereof, and means for pivotally suspending the platforms of each pair from said ring, whereby as said ring is intermittently rotated the pairs of platforms successively pass through the said openings in said floors and pairs of platforms are brought into alignment with the various floors.

5. In a garage, air-raid shelter or the like, a structure including a plurality of floors having openings therein, and an elevating mechanism comprising a ring rotatably supported in a vertical plane and extending through said floors and provided on its outer circumference with gear teeth and with bearing surfaces, a fixed ring surrounding and spaced from said rotatable ring, rollers rotatably mounted in said fixed ring and cooperating with said bearing surfaces for supporting said rotatable ring, means cooperating with said gear teeth for intermittently rotating said ring, load-carrying platforms arranged in pairs with the platforms in each pair extending laterally from said ring on opposite sides thereof, and means for pivotally suspending the platforms of each pair from said ring, whereby as said ring is intermittently rotated the pairs of platforms successively pass through the said openings in said floors and pairs of platforms are brought into alignment with the various floors.

6. In a garage, air-raid shelter or the like, a structure including a plurality of floors having openings therein, and an elevating mechanism comprising a ring rotatably supported in a vertical plane and extending through said floors, means for intermittently rotating said ring, load-carrying platforms arranged in pairs with the platforms in each pair extending laterally from said ring on opposite sides thereof, shafts equal in number to said pairs of platforms and extending laterally from each face of said ring and equally spaced from one another, and means cooperating with each of said shafts and a pair of said platforms for pivotally supporting said platforms from said shaft, whereby as said ring is intermittently rotated the pairs of platforms successively pass through the said openings in said floors and pairs of platforms are brought into alignment with the various floors.

FRED CAIOLA.

References Cited in the file of this patent
UNITED STATES PATENTS

| Number | Name | Date |
| --- | --- | --- |
| 2,297,199 | Buddecke | Sept. 29, 1942 |